No. 621,563. Patented Mar. 21, 1899.
E. A. GILBERT.
ICE CREAM FREEZER.
(Application filed June 30, 1898.)
(No Model.) 2 Sheets—Sheet 1.
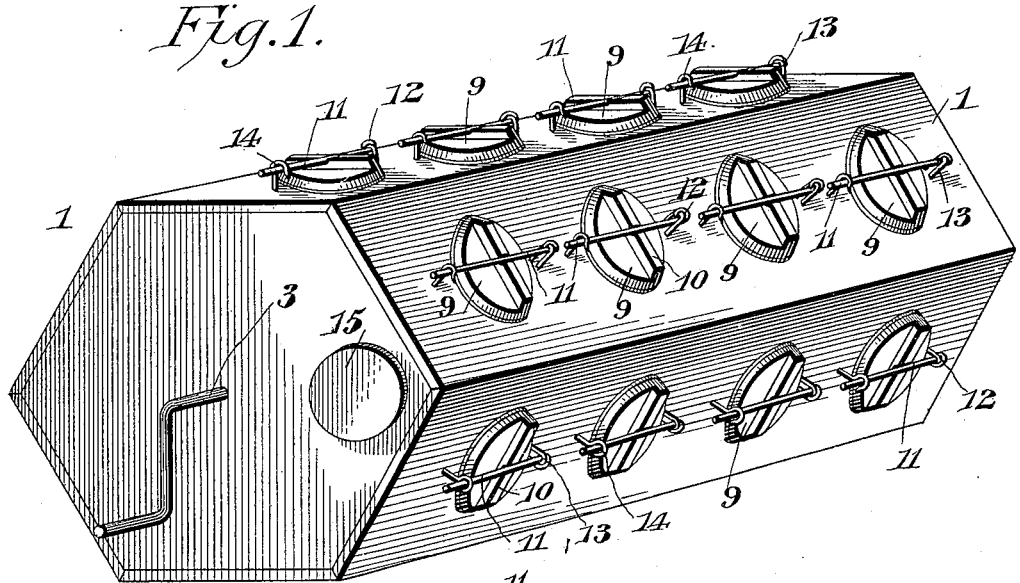
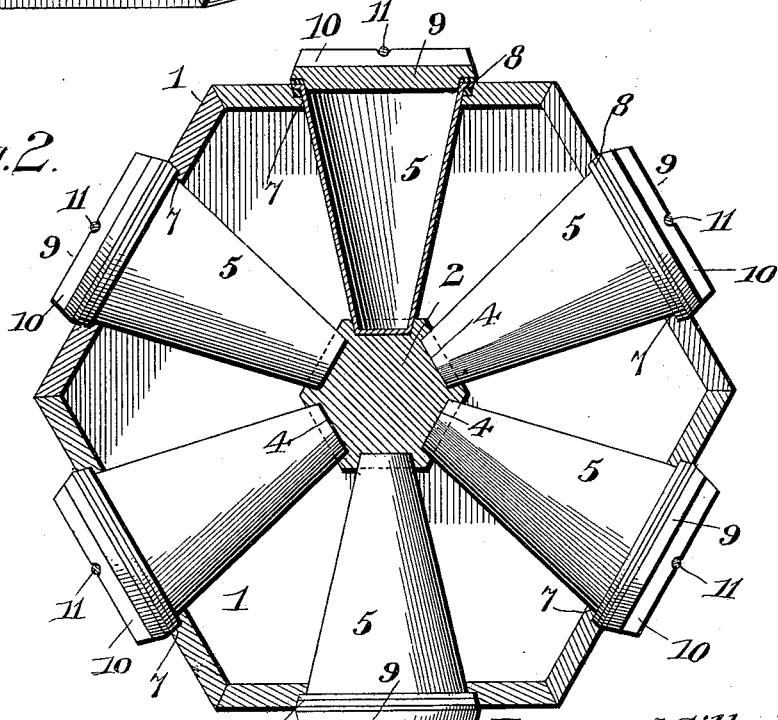
Witnesses
Jas. K. McCathran
J. F. H. Riley
Edward A. Gilbert, Inventor
By his Attorneys,

No. 621,563. Patented Mar. 21, 1899.
E. A. GILBERT.
ICE CREAM FREEZER.
(Application filed June 30, 1898.)
(No Model.) 2 Sheets—Sheet 2.

Witnesses
Jas. K. McCathran
J. F. Riley

Edward A. Gilbert, Inventor
By his Attorneys,
C. A. Snow & Co.

THE NORRIS PETERS CO., PHOTO-LITHO., WASHINGTON, D. C.

UNITED STATES PATENT OFFICE.

EDWARD A. GILBERT, OF MYERS, FLORIDA, ASSIGNOR OF ONE-HALF TO THOMAS COURSER, OF SAME PLACE.

ICE-CREAM FREEZER.

SPECIFICATION forming part of Letters Patent No. 621,563, dated March 21, 1899.

Application filed June 30, 1898. Serial No. 684,863. (No model.)

*To all whom it may concern:*

Be it known that I, EDWARD A. GILBERT, a citizen of the United States, residing at Myers, in the county of Lee and State of Florida, have invented a new and useful Ice-Cream Freezer, of which the following is a specification.

The invention relates to improvements in ice-cream freezers.

The object of the present invention is to improve the construction of ice-cream freezers and to provide a simple and comparatively inexpensive one adapted to freeze cream simultaneously in a large number of separate receptacles and capable of thoroughly agitating the contents of the cream-receptacles and thoroughly subjecting the latter to the freezing mixture, so that ice-cream may be made in a short space of time and at the expenditure of a minimum amount of labor.

The invention consists in the construction and novel combination and arrangement of parts hereinafter fully described, illustrated in the accompanying drawings, and pointed out in the claims hereto appended.

Figure 3:
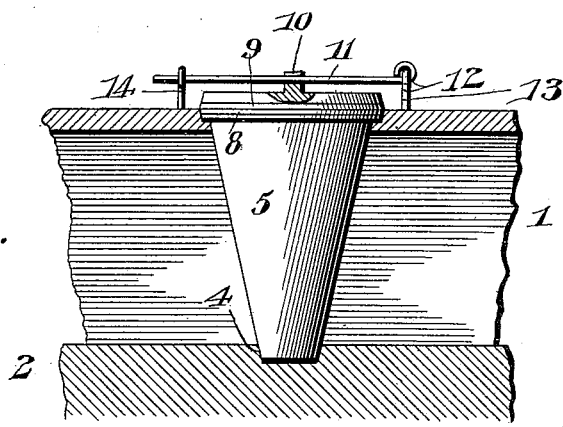
Figure 6:
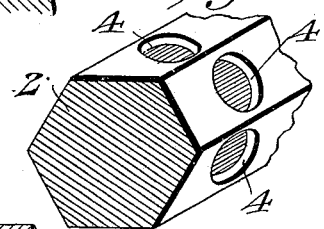
Figure 4:
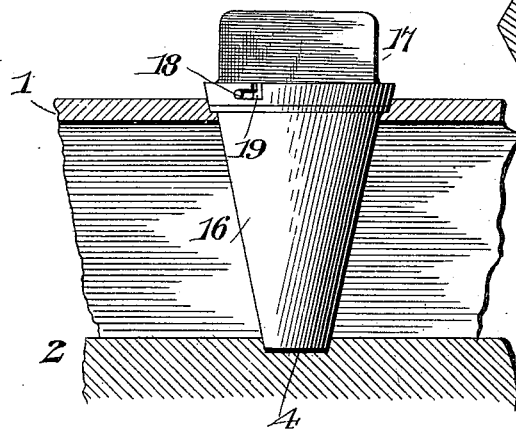
Figure 7:
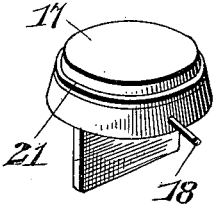
Figure 5:
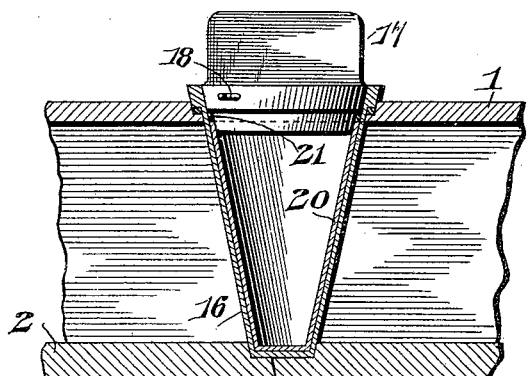

In the drawings, Figure 1 is a perspective view of an ice-cream freezer constructed in accordance with this invention. Fig. 2 is a transverse sectional view. Fig. 3 is an enlarged detail sectional view illustrating the manner of mounting the cream receptacles or cans in the rotary casing. Figs. 4 and 5 are detail views illustrating a modification of the cream receptacles or cans. Fig. 6 is a detail view of a portion of the central shaft or support. Fig. 7 is a detail view of the cover of the can or receptacle shown in Figs. 4 and 5.

Like numerals of reference designate corresponding parts in all the figures of the drawings.

1 designates a rotary ice-receptacle polygonal in cross-section, designed to be journaled in bearings of a suitable frame or support and provided with a central longitudinal bar or shaft 2. The shaft 2, which is provided at its ends with suitable exterior journals 3, is polygonal in cross-section between the ends of the casing 1, and its faces agree in number with the faces of the rotary casing and are parallel with the same and are provided at intervals with sockets 4 to receive and support the inner ends of cans or receptacles 5. The shaft forms a central support for the inner ends of the cans, which are disposed radially with relation to the rotary receptacles, and each of the faces of the latter is provided with a longitudinal series of openings 7 for the reception of the cans 5.

The cans 5, which taper toward their inner ends, are preferably circular in cross-section, and the sockets 4 correspond to the configuration of the inner ends of the cans. The outer ends of the cans are provided with annular flanges 8, which are seated in corresponding recesses of the rotary casing, and the covers 9 of the cans are provided with exterior ribs 10 and are secured in place by resilient locking-rods 11, engaging notches of the ribs 10 and also serving as a means for securing the cans in the openings of the rotary casing. Each resilient rod is hinged at one end to the casing 1 by means of any eye 12, formed on the rod, and a staple or eye 13, mounted on the casing, and the other end of the rod detachably engages a hook or keeper 14. The staple or eye 13 is located at one side of each of the openings of the rotary receptacles, and the hook or keeper 14 is disposed at the other side.

One end of the rotary casing is provided with an opening normally covered by a cap 15, adapted to be removed when the casing is to be supplied with ice and also to permit the removal of the same. When the casing is rotated, the contents of the cans are thrown from one end of each can to the other end thereof, and by this operation the contents are thoroughly subjected to the action of the freezing mixture and ice-cream is produced in a short space of time.

As illustrated in Figs. 4 and 5 of the accompanying drawings, permanently mounted cans 16 may be employed, and when these are used they are provided with covers 17, detachably interlocked with the cans by means of lugs or projections 18 and bayonet-slots 19. The cans 16 are provided with removable inner receptacles 20, which contain the cream, and the cover 17 is provided with a depending portion that closes the upper end of the removable receptacle 20. A suitable packing-ring 21 is preferably interposed between the upper edge of the inner receptacle and the cover 17.

The invention has the following advantages: The ice-cream freezer, which is simple and comparatively inexpensive in construction, is adapted to freeze cream rapidly in a large number of cans, and as the covers of the cans are located on the exterior of the rotary receptacle and the ice and salt are arranged within the same there is no liability of accidentally getting salt into the cans.

Changes in the form, proportion, and minor details of construction may be resorted to without departing from the spirit or sacrificing any of the advantages of this invention.

What I claim is—

1. In a device of the class described, the combination of a rotary casing provided with series of openings, radially-arranged cans extending through the openings of the casing, and a centrally-arranged support mounted within the casing and having the inner ends of all the cans abutting against it, whereby the said cans are supported, substantially as described.

2. In a device of the class described, the combination of a rotary polygonal casing having an annular series of flat sides provided at intervals with openings, radially-arranged cans extending into the casing through the said openings, and a centrally-arranged polygonal support having its faces corresponding with the sides of the casing and having the inner ends of all the cans abutting against it, said support being provided at intervals with recesses forming sockets for the cans, substantially as described.

3. In a device of the class described, the combination of a rotary casing provided at intervals with openings, radially-arranged cans extending through the openings of the casing and having exterior covers, a longitudinal bar arranged centrally of the casing and having the inner ends of the cans abutting against it, and provided with recesses forming sockets for the same, and fastening devices mounted on the casing and retaining the covers on the cans, substantially as described.

In testimony that I claim the foregoing as my own I have hereto affixed my signature in the presence of two witnesses.

EDWARD A. GILBERT.

Witnesses:
J. W. BOWEN,
L. A. HENDRY.